(12) United States Patent
McDonnell (10) Patent No.: US 8,885,211 B1
(45) Date of Patent: Nov. 11, 2014

(54) METHOD AND APPARATUS FOR GENERATING PRINT JOBS FOR MULTIPLE TYPES OF MEDIA

(75) Inventor: Phil McDonnell, Coto de Caza, CA (US)

(73) Assignee: Marvell International Ltd., Hamilton (BM)

( * ) Notice: Subject to any disclaimer, the term of this patent is extended or adjusted under 35 U.S.C. 154(b) by 259 days.

(21) Appl. No.: 13/311,966

(22) Filed: Dec. 6, 2011

Related U.S. Application Data (60) Provisional application No. 61/427,021, filed on Dec. 23, 2010.

(51) Int. Cl.
*G06F 15/00* (2006.01)
*G06F 3/12* (2006.01)
*G06K 1/00* (2006.01)

(52) U.S. Cl.
USPC ............... 358/1.6; 358/1.1; 358/1.2; 358/1.9

(58) Field of Classification Search
CPC combination set(s) only.
See application file for complete search history.

(56) References Cited

U.S. PATENT DOCUMENTS 7,684,086 B2 * 3/2010 Morales et al. .............. 358/3.26

\* cited by examiner

*Primary Examiner* — Thierry L Pham (57) ABSTRACT

A document is prepared for printing by creating a base image and supplemental image data corresponding to different types of print media. When printing, the current media type is detected and the corresponding supplemental image data is used in conjunction with the base image to create media-specific image data for printing on the current media type.

18 Claims, 5 Drawing Sheets

METHOD AND APPARATUS FOR GENERATING PRINT JOBS FOR MULTIPLE TYPES OF MEDIA

CROSS-REFERENCE TO RELATED APPLICATION

The present disclosure claims priority to U.S. Provisional Patent Application 61/427,021, filed on Dec. 23, 2010, which is hereby incorporated herein by reference.

TECHNICAL FIELD

This disclosure relates printing technology, and more particularly to optimizing printing and print jobs for different types of media.

BACKGROUND

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

Ink-based printing devices sometimes use ink depletion methods to avoid problems with adjacent pigments bleeding into one another. These methods can be made more effective by taking into account the characteristics of the type of media (referred to herein as "media type") upon which the ink is deposited. For example, an ink depletion method typically used for a rough media type (e.g., "plain" paper) can be more vigorous than that used for a smoother media type (e.g., fine "photo" paper).

The ink depletion methods may be implemented by processing a source image before the source image is sent to a printer. For example, a print driver of a personal computer may process a source image to create a printer-ready image or print job that is subsequently sent to a printer. Conventional image processing techniques are typically based on a specification of media type made by the user. However, a media type specified by a user may not always match a media type that is actually available to a printer.

Some printers are capable of detecting media types. In situations where the user has incorrectly specified the media type, the printer may be able to detect the problem and return a notification to the printer driver. The printer driver can respond by repeating its processing, this time based on the media type specified by the printer. However, this causes additional communication overhead between the printer and the printer driver, and also causes delays as the printer waits for the additional processing to be performed.

One way to address this problem is for the printer driver to query the printer before performing media-specific processing. However, the printer itself may not be able to detect the current media type until a print job is actually initiated. For example, the media type may not be detectable until the printer feeds the first sheet of paper. Furthermore, the media type may change part way through a print job, such as when one sheet of paper is followed by a sheet of a different media type.

The problem can also be addressed by performing any media-specific processing at a point in the job flow after the media type has been detected and/or is known. However, this is often impractical because the media-specific processing may require more resources than are available at that point.

SUMMARY

The present invention prepares a document for printing to different types of media. In one aspect, a method includes preparing a base image corresponding to the document and a plurality of supplemental images corresponding respectively to the different types of media. The supplemental images are used in conjunction with the base image to create media-specific images corresponding respectively to the different types of media.

In another aspect of the present invention, one or more computer-readable media have instructions stored thereon that are executable by a processor to perform actions that include preparing a base image and a plurality of supplemental images corresponding respectively to different types of media. The supplemental images in conjunction with the base image represent media-specific images corresponding respectively to the different types of media.

In yet another aspect of the present invention, a printer has a media type detector configured to detect a currently available type of media. A processing module receives (i) base image data and (ii) supplemental image data for a document that is to be printed. The processing module creates a media-specific image based at least in part on (i) the base image data and (ii) supplemental image data corresponding to the currently available type of media, as identified by the media type detector. The printer then prints the media-specific image.

BRIEF DESCRIPTION OF THE DRAWINGS

Embodiments of the present disclosure will be readily understood by the following detailed description in conjunction with the accompanying drawings. To facilitate this description, like reference numerals designate like structural elements.

DETAILED DESCRIPTION OF EMBODIMENTS OF THE DISCLOSURE

The description incorporates use of the phrases "in an embodiment," or "in various embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group)

and/or memory (shared, dedicated, or group) that execute one or more software or firmware programs, a combinational logic circuit, and/or other suitable components that provide the described functionality. The logic and functionality described herein may be implemented by any such components.

Figure 1:
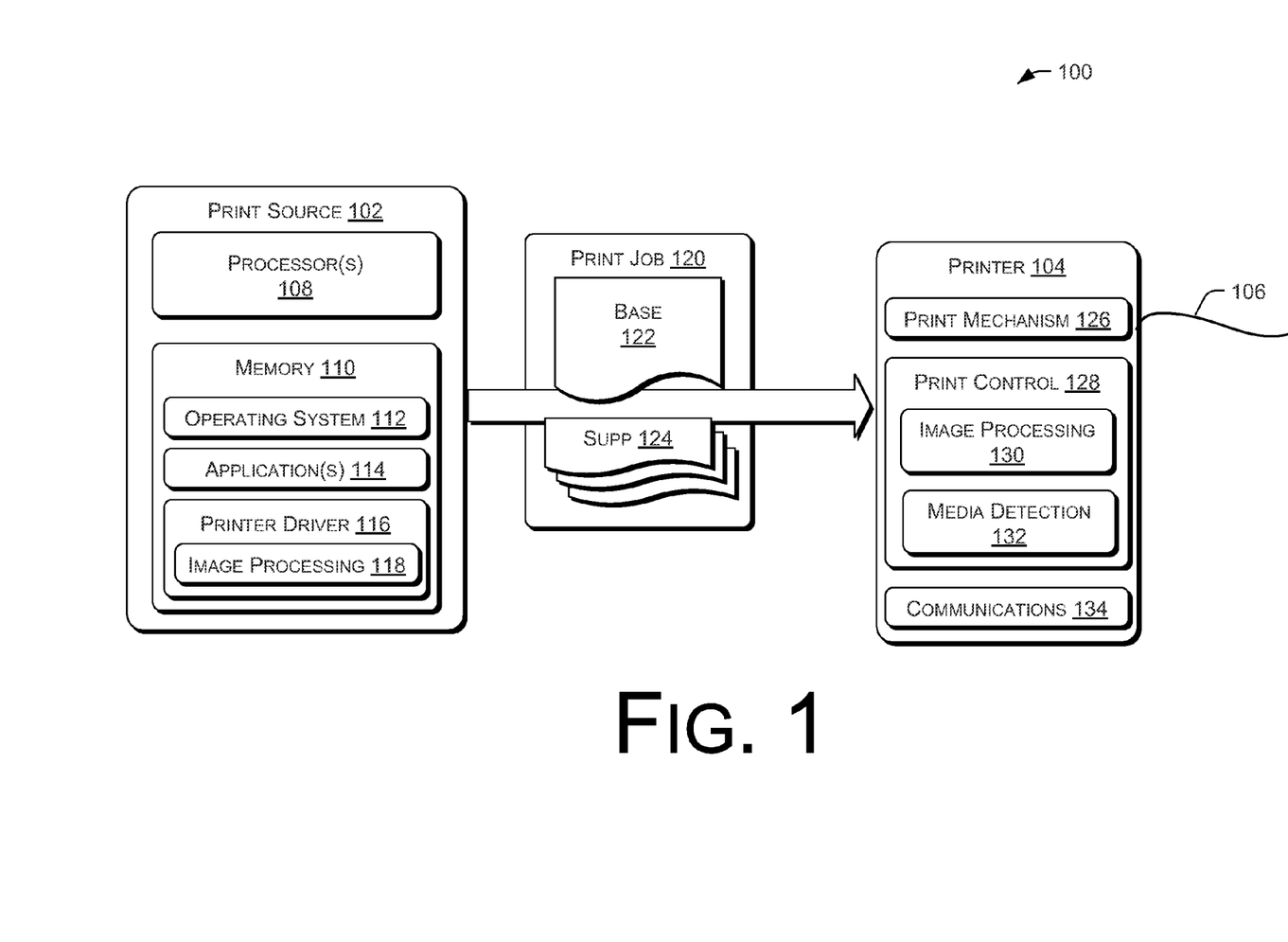
FIG. 1 is a block diagram showing an environment in which print jobs may be submitted from a print source to a print device in accordance with the techniques described herein.

FIG. 1 illustrates an environment 100 containing a print source 102 and a print device 104. The print source 102 may be a personal computer, a communications device, a viewing device or terminal, or other device, component, or entity capable of processing and providing print images. The print device 104 may be an inkjet printer, print component, or other element that receives print jobs or images and that prints them on various types of media 106. The print images may comprise text images, graphics images, and so forth, and may be in black-and-white or color.

In the example environment of FIG. 1, the print source 102 comprises a personal computer or other similar type of device with which a user may interact to select or designate documents and images for printing. Devices such as this may include desktop computers, tablet computers, laptop computers, handheld computers, communications devices, multipurpose devices, personal media devices, and so forth. Documents to be printed may include textual documents, pictures, drawings, spreadsheets, photographs, and so forth.

In the described embodiment, in which the print source 102 is a personal computer, the print source has one or more processors 108 and associated memory 110. The memory 110 may comprise various types of computer-readable storage media, including integrated and removable media, internal and external media, local and remote media, volatile and non-volatile memory, and so forth. Media technologies may include electronic, magnetic, optical, and other technologies that are associated with devices such as removable disks, hard disks, thumb drives, compact discs (CDs), digital versatile disks (DVDs), randomly addressable memory (RAM), read-only memory (ROM), universal serial bus (USB) devices, and so forth.

The memory 110 is used to store programs, routines, scripts, components, and/or instructions that are executable by the processor 108, and that when executed implement the functionality attributed below to the print source 102. The memory 110 is also used to store various types of data, including documents and images that are to be printed.

In this example, the memory 110 stores an operating system 112 and one or more application programs 114. The memory 110 also stores a printer driver 116, which may in turn include an image processing component 118. The printer driver 116 may be considered part of the operating system 112 in some embodiments, although in many situations it may be installed by a user in conjunction for use in conjunction with a particular printer to which the user has access.

When printing, a user typically interacts with an application program 114 such as a word processing program, a picture editing program, browser, viewer, or other program. Upon being instructed to print a document, the application program sends the document or some form of the document to the printer driver 116. The printer driver 116 processes the document to create a print job 120, which is provided or sent to the print device 104.

In order to create the print job 120, (in one embodiment) the printer driver 116 creates a plurality of images, representing different image versions of a document that are optimized for printing on different types of print media. Specifically, the printer driver 116 creates a base image 122 and a plurality of supplemental images or difference images 124, where the supplemental or difference images 124 correspond respectively to the different types of print media that might be available for printing on the print device 104. Each of the supplemental images 124 indicates differences between the base image and the media-specific image corresponding to a given media type. More specifically, each of the supplemental images 124 contains data that can be used in conjunction with the base image 122 to create a composite, media-specific image that accounts for bleed characteristics or other characteristics of a particular media type. Further details regarding the base image 122 and the supplemental images 124 will be described below, in conjunction with the discussion of FIGS. 2-5.

The print device 104 includes a print mechanism 126 and associated a print control module or logic component 128. The print component or control logic 128 includes or operates in conjunction with a processing module or image processing logic 130, and has or has access to a media detector or media detector module 132, comprising media detection logic and components that are capable of detecting and identifying various types of media as they are fed into the print device 104 by the print mechanism 126.

The print device 104 also has communications components and logic 134. Communications between the print source 102 and the print device 104 may be through various means, such as by using available wired, wireless, and/or networked communications technologies.

When the print job 120 is received by the print device 104, the print control logic 128 identifies the type of print media that is currently available or loaded, and selects a supplemental image 124 corresponding to that print media type. The image processing component 130 combines the selected supplemental image 124 with the base image 122 to create a composite, print-ready, media-specific image, which is then printed on the currently available media. Because each page may be of a different media type, the media detection may take place with each new page, and the decision regarding which supplemental image to use may likewise be performed anew with each page. Further note that the data of the print job 120 may organized in various ways, such as line-by-line or page-by-page.

Note that although FIG. 1 represents a typical data flow for a print job, the techniques described herein may be utilized in other environments and in conjunction with different types of components. Specifically, the print source 102 does not necessarily comprise a personal computer or similar device used for viewing or editing documents. Rather, the functions and actions attributed below to the print source 102 may be performed by other elements or components, such as by components that are in a data flow downstream of an original print source, or by components of a multi-function device like a multi-function printer. Furthermore, actions that are attributed herein to the print device 104 may be performed by any components that are in the upstream data flow relative to the print mechanism 126.

Figure 2:
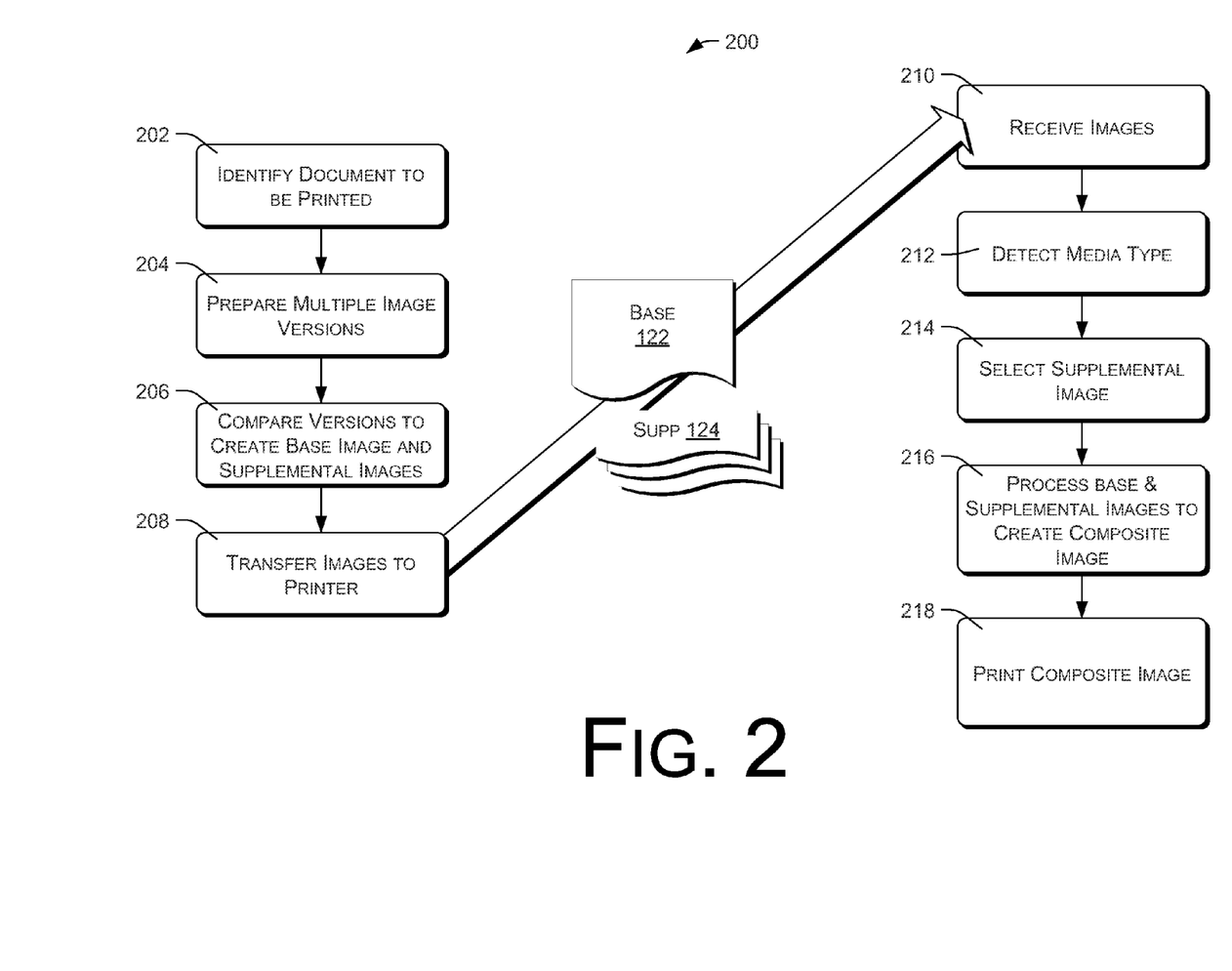
FIG. 2 is a flow diagram illustrating a method of processing a document for printing to one of multiple media types in accordance with the techniques described herein.

FIG. 2 illustrates a method 200 of printing a document while dynamically accounting for various media types, as may be implemented within the environment 100 depicted by FIG. 1. Actions along the left side of FIG. 2 are performed by the print source 102. Actions along the right side of FIG. 2 are performed by the print device 104. More generally, however, actions along the left side of FIG. 2 may be performed by an upstream component or element of a print stream, at a point in a process flow or print stream where the media type is not known or not identifiable. Actions on the right side of FIG. 2 are performed by a downstream component or element of the print stream, at a point where it is possible to determine current media type.

An action 202 comprises identifying a document to be printed. The document may be identified by a user in conjunction with an application program or other software executing on the print source 102. In many situations, the document is identified by the user selecting a print operation when editing or viewing a document. The document may comprise a single page or multiple pages.

An action 204 comprises processing the document to prepare and/or create a plurality of media-specific images or image versions. Each of the media-specific images corresponds to a media type or group of media types, and is optimized for that media type or group of media types. In particular, the processing of action 204 is performed using ink depletion methods that account for the bleed characteristics of the different media types, so that each of the media-specific images corresponds to and is optimized for a particular media type or group of media types.

Figure 3:
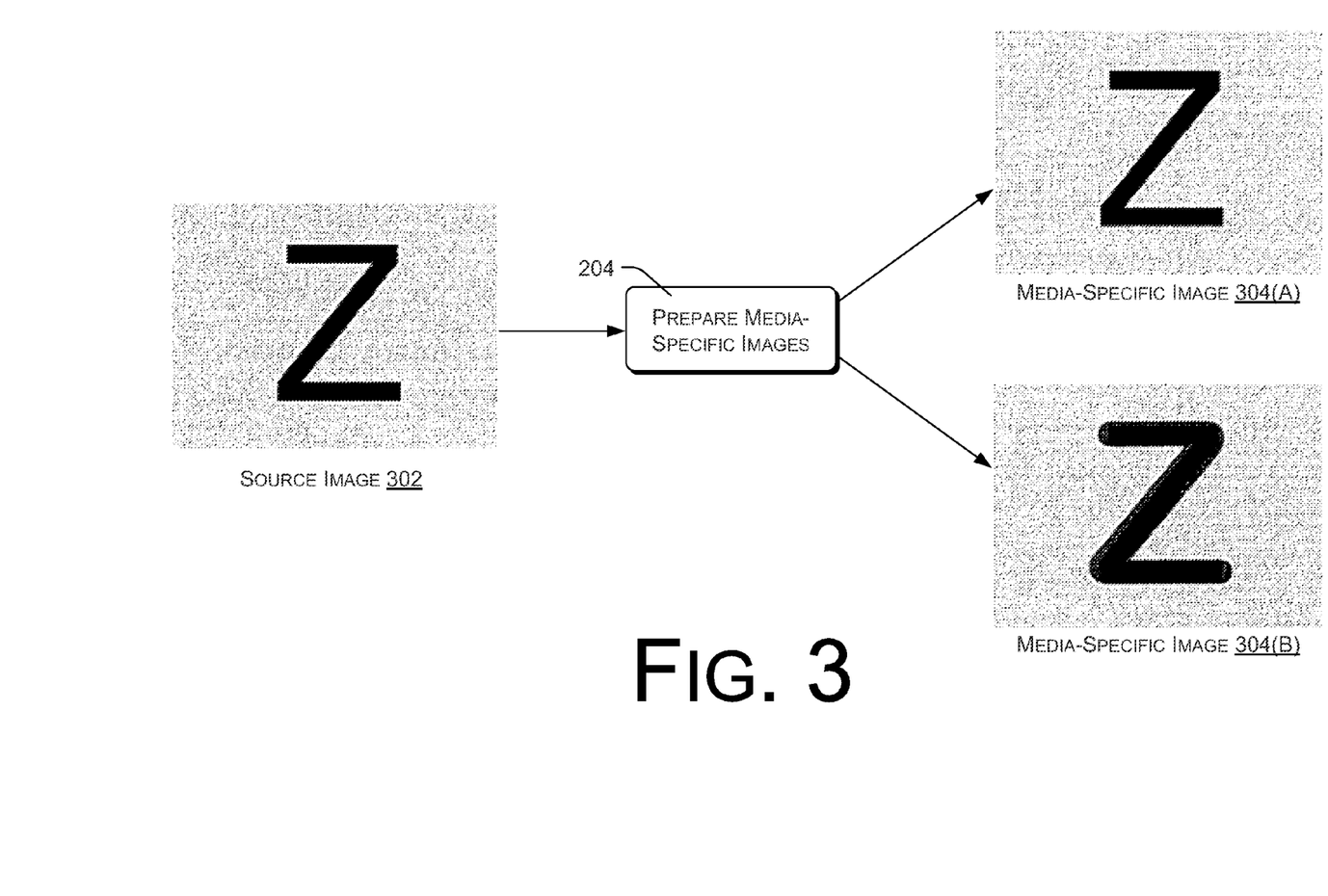
FIG. 3 is a block diagram illustrating an action of preparing multiple media-specific images for different media types.

FIG. 3 illustrates aspects of the action 204, where a source image 302 is processed to create a first media-specific image 304(A) and a second media-specific image 304(B). As mentioned above, each of the media-specific images 304 is created using an ink depletion strategy that accounts for the bleed characteristics of a corresponding media type. This potentially results in variations between the media-specific images 304, especially in areas near color or intensity edges. In this example, there is a boundary region that is different in each of the media-specific images 304 to account for bleed characteristics of the media types for which the images are optimized. Note that the illustrated media-specific images are not actual images; rather, they are simplified diagrammatic representations designed to show generally how two images might differ slightly from each other to account for characteristics and differences in media types. Different colors and/or areas within the images are represented by patterns.

Returning to FIG. 2, an action 206 comprises comparing the multiple media-specific images 304 to prepare and/or create the base image 122 and the multiple supplemental images 124. The base image 122 and the supplemental images 124 are derived from the media-specific images.

The base image 122 contains base or nominal image data, and the supplemental images 124 contain supplemental or difference image data representing differences, changes, modifications, deletions, and/or additions to the base image 122. Each of the supplemental images 124 corresponds to a respective media type, and each supplemental image 124 can be combined with or processed in conjunction with the base image 122 to create or reconstruct a media-specific image that corresponds to a particular media type and that is optimized or accounts for different characteristics of that particular media type.

For example, in one embodiment the base image comprises or indicates values for all pixels that are identical in all of the image versions. The supplemental images comprise the remaining pixels—those pixels that differ in at least two of the multiple image versions. Pixels of the base image and one of the supplemental images can be combined in this embodiment to reconstruct one of the media-specific image versions 304.

Thus, in the described embodiment, the action 206 includes analyzing the different media-specific images 304 (FIG. 3) to identify data, elements, pixels, portions, etc. that are common to all of the media-specific images. For example, the action 206 may identify all image pixels that are common to and have identical values across all of the media-specific images, and the base image 122 may indicate values for only these pixels. Thus, the base image 122 may comprise image elements or data that are common to the plurality of media-specific images and therefore common to the different media types.

Similarly, the action 206 may identify all data, elements, pixels, portions, etc. that vary or are different between the media-specific images. For example, the action 206 may identify all image pixels that have different values from one media-specific to another, and the supplemental image 124 may indicate values for only these different pixels.

Figure 4:
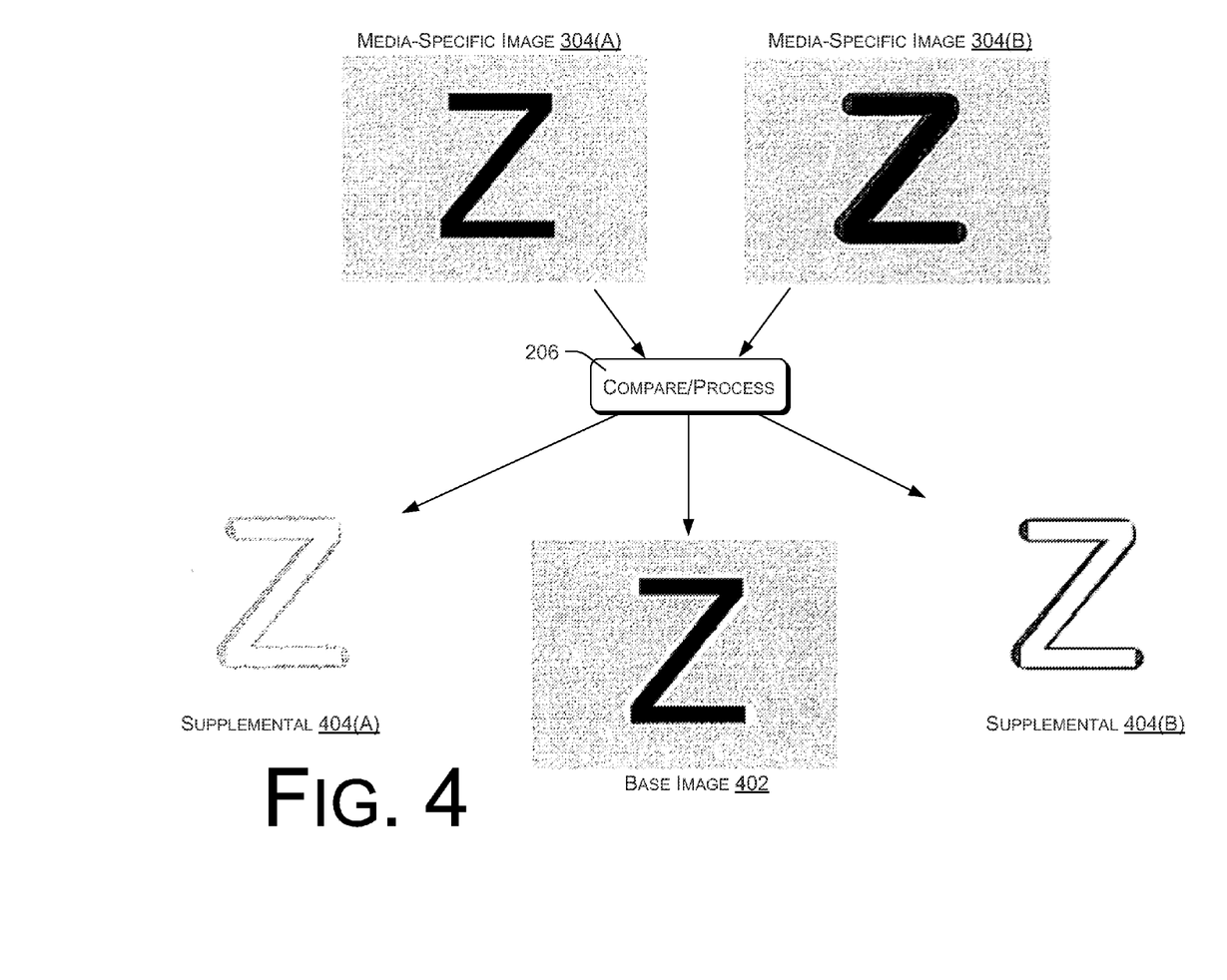
FIG. 4 is a block diagram illustrating an action of preparing a base image and multiple supplemental images that correspond respectively to the multiple media-specific images of FIG. 3.

FIG. 4 illustrates aspects of the action 206, where the media-specific images 304(A) and 304(B) of FIG. 3 are processed to create a base image 402, a first supplemental image 404(A), and second supplemental image 404(B). As explained above, the base image 402 contains data or pixels that are common to both of the media-specific images 304(A) and 304(B), such as those pixels having identical values. The first supplemental image 404(A) contains data or pixels that are particular or unique to the first media-specific image 304(A). The second supplemental image 404(B) contains data or pixels that are particular or unique to the second media-specific image version 304(B).

Referring again to FIG. 2, an action 208 comprises transferring the base data or images 122 and the supplemental data or images 124 to the print device 104 or other print component, for subsequent selection of an individual one of the supplemental images 124 depending on dynamically-identified media availability.

The printer 502 performs an action 210 of receiving the base data or images 122 and the supplemental data or images 124. An action 212 comprises detecting the media type of the currently available print media. Media types, for example, might include plain paper and various grades of photographic paper. In many printers, media detection occurs upon loading or feeding each sheet of media.

An action 214, performed in response to the action 212 of detecting the media type, comprises selecting one of the supplemental images 124 that corresponds to the detected media type.

An action 216 comprises processing the base image 122 and the selected supplemental image 124 to create a composite or media-specific image corresponding to the current media type. In some embodiments, this may comprise simply combining the pixel values from the base image 122 and the selected supplemental image 124. In other embodiments, pixel values of the base image 122 may be modified based on the pixel values of the selected supplemental image 124.

Figure 5:
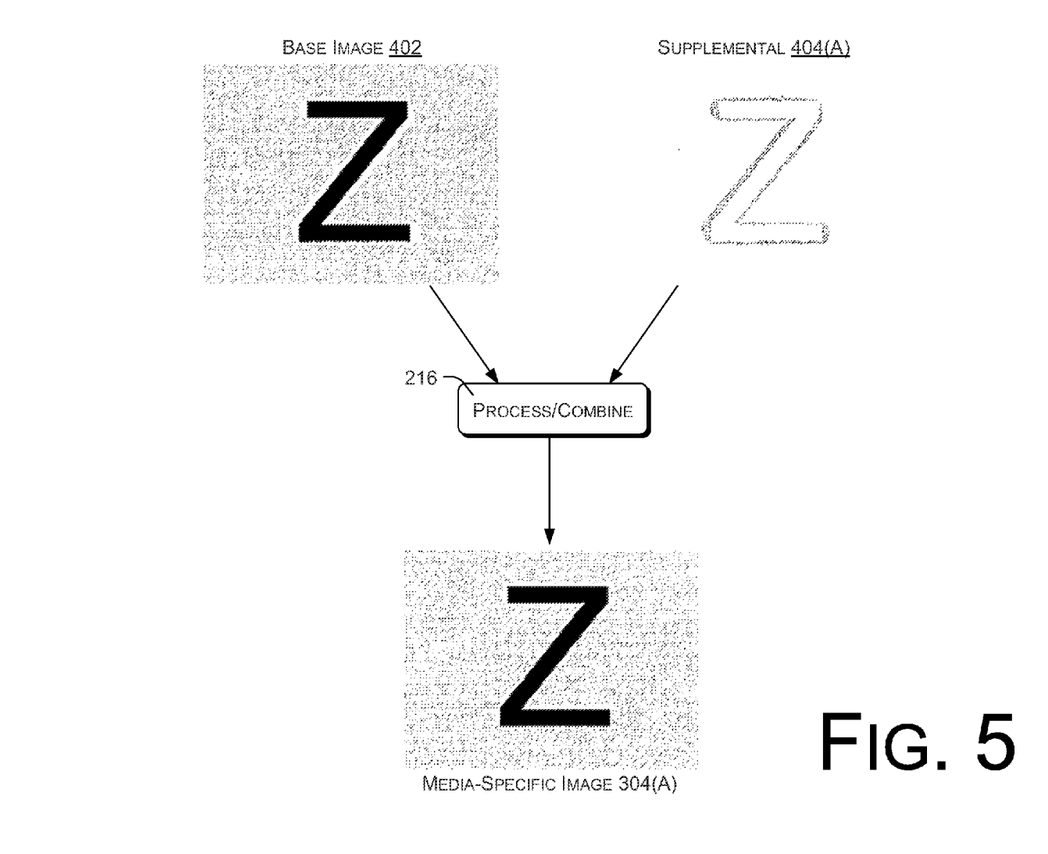
FIG. 5 is a block diagram illustrating an action of reconstructing a media-specific image based on the base image and one of the supplemental images of FIG. 4.

FIG. 5 illustrates the result of the action 216, in which the base image 402 and the supplemental image 404(A) are processed or combined to reconstruct the media-specific image 304(A).

Returning again to FIG. 2, an action 218 comprises printing the reconstructed composite image 502.

The described techniques allow a print component to efficiently obtain print data from an upstream component for different media types, without complicating inter-device communications. The print component is allowed to dynamically determine and change the type of media that is being rendered, and to select an appropriate image version that is optimized for the media type. These techniques add to communications overhead by only a small degree, because, because the supplemental images are typically relatively small.

In accordance with various embodiments, an article of manufacture may be provided that includes a storage medium having instructions stored thereon that, if executed, result in the operations described above. In an embodiment, the storage medium comprises some type of non-transitory memory (not shown). In accordance with various embodiments, the article of manufacture may be a computer-readable medium such as, for example, software or firmware.

Various operations may have been described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Although certain embodiments have been illustrated and described herein, a wide variety of alternate and/or equivalent embodiments or implementations calculated to achieve the same purposes may be substituted for the embodiments illustrated and described without departing from the scope of the present disclosure. This application is intended to cover any adaptations or variations of the embodiments discussed herein. Therefore, it is manifestly intended that embodiments in accordance with the present disclosure be limited only by the claims and the equivalents thereof.

What is claimed is:

1. A method of processing a document for printing to one of different types of media, the method comprising:
   preparing, by a print source, a base image corresponding to the document, wherein the base image includes base image data that is generic to each of the different types of media;
   based on the base image data that is generic to each of the different types of media, preparing a plurality of supplemental images corresponding respectively to the different types of media, wherein the plurality of supplemental images are to be used in conjunction with the base image to create media-specific images corresponding respectively to the different types of media; and
   transferring (i) the base image and (ii) the plurality of supplemental images to a print component, to cause the print component to (A) depending on media availability, select a first supplemental image of the plurality of supplemental images and (B) create a first media-specific image from the base image and the first supplemental image of the plurality of supplemental images.

2. The method of claim 1, wherein the supplemental image corresponding to a given type of media indicates differences between the base image and a media-specific image corresponding to the given type of media.

3. The method of claim 1, wherein the supplemental image corresponding to a given type of media indicates values for image pixels that differ between the media-specific images.

4. The method of claim 1, wherein the base image indicates values for image pixels that are common between the media-specific images.

5. The method of claim 1, further comprising:
   processing the document to create the media-specific images;
   optimizing the media-specific images for their corresponding types of media; and
   deriving the plurality of supplemental images from the media-specific images.

6. The method of claim 1, further comprising:
   processing the document to create the media-specific images;
   optimizing the media-specific images to account for bleed characteristics of their corresponding types of media; and
   deriving the plurality of supplemental images from the media-specific images.

7. One or more non-transitory computer-readable media having instructions stored thereon that are executable by a processor to perform actions comprising:
   preparing a base image for printing, wherein the base image includes base image data that is generic to each of different types of media;
   based on the base image data that is generic to each of the different types of media, preparing a plurality of supplemental images corresponding respectively to the different types of media, the plurality of supplemental images in conjunction with the base image representing media-specific images corresponding respectively to the different types of media; and
   transferring (i) the base image and (ii) the plurality of supplemental images to a print component, to cause the print component to (A) depending on media availability, select a first supplemental image of the plurality of supplemental images and (B) create a first media-specific image from the base image and the first supplemental image of the plurality of supplemental images.

8. The one or more non-transitory computer-readable media of claim 7, wherein the supplemental image corresponding to a given media type indicates differences between the base image and the media-specific image corresponding to the given type of media.

9. The one or more non-transitory computer-readable media of claim 7, wherein the supplemental image corresponding to a given type of media indicates values for image pixels that differ between the media-specific images.

10. The one or more non-transitory computer-readable media of claim 7, wherein the base image indicates values for image pixels that are common between the media-specific images.

11. The one or more non-transitory computer-readable media of claim 7, the actions further comprising:
    processing the document to create the media-specific images;
    optimizing the media-specific images for their corresponding types of media; and
    deriving the plurality of supplemental images from the media-specific images.

12. The one or more non-transitory computer-readable media of claim 7, the actions further comprising:
    processing the document to create the media-specific images;
    optimizing the media-specific images to account for bleed characteristics of their corresponding types of media; and
    deriving the plurality of supplemental images from the media-specific images.

13. A printer comprising:
    a media type detector configured to detect a currently available type of media; and
    a processing module configured to receive (i) base image data and (ii) a plurality of supplemental image data for a document that is to be printed,
    wherein the plurality of supplemental image data respectively corresponds to different types of media,
    wherein the processing module is further configured to
       based on the currently available type of media, select a first supplemental image data of the plurality of supplemental image data, wherein the first supplemental image data of the plurality of supplemental image data corresponds to the currently available type of media, create a first media-specific image based at least in part on (i) the base image data and (ii) the first supplemental image data corresponding to the currently available type of media, and a print component that prints the first media-specific image.

14. The printer of claim 13, wherein the plurality of supplemental image data accounts for bleed characteristics of the different types of media.

15. The printer of claim 13, wherein the plurality of supplemental image data comprises difference images corresponding respectively to the different types of media.

16. The printer of claim 13, wherein the base image data comprises image elements that are common to media-specific images corresponding to the different types of media.

17. The printer of claim 13, wherein the plurality of supplemental image data comprises image elements that differ between media-specific images corresponding to the different types of media.

18. The printer of claim 13, wherein:

the base image data comprises image elements that are common to media-specific images corresponding to the different types of media; and the plurality of supplemental image data comprises image elements that differ between media-specific images corresponding to the different types of media.

* * * * *